April 11, 1972     L. D. LEITER ET AL     3,655,860

METHOD FOR CONSTRUCTING HANDLE OF THERMOPLASTIC MATERIAL

Original Filed March 14, 1968     3 Sheets-Sheet 1

April 11, 1972   L. D. LEITER ET AL   3,655,860
METHOD FOR CONSTRUCTING HANDLE OF THERMOPLASTIC MATERIAL
Original Filed March 14, 1968   3 Sheets-Sheet 2

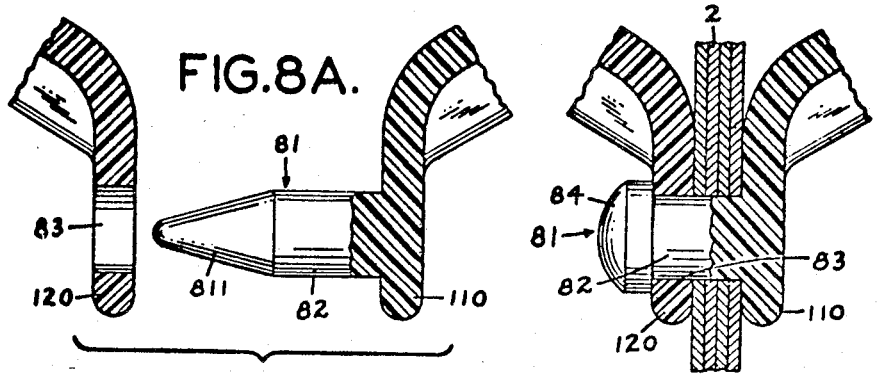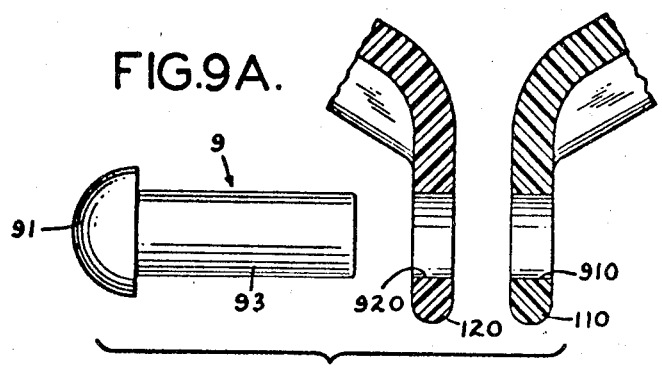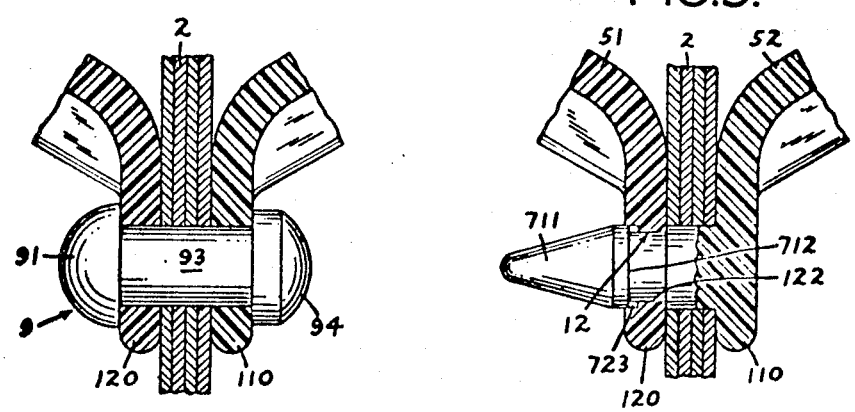

United States Patent Office 3,655,860
Patented Apr. 11, 1972

3,655,860
METHOD FOR CONSTRUCTING HANDLE OF THERMOPLASTIC MATERIAL
Leigh D. Leiter, Philadelphia, Pa., and Frank R. Linda, Bridgeport, Conn., assignors to International Paper Company, New York, N.Y.
Division of application Ser. No. 712,993, Mar. 14, 1968, now Patent No. 3,481,528, and a continuation-in-part of applications Ser. No. 521,362, Jan. 18, 1966, now Patent No. 3,373,924, and Ser. No. 565,045, July 6, 1966. Divided and this application June 23, 1969, Ser. No. 858,218
Int. Cl. B29f 3/08; B29c 25/00
U.S. Cl. 264—237
3 Claims

ABSTRACT OF THE DISCLOSURE

A method for constructing a handle of thermoplastic material by forming the material at an elevated temperature into an open loop having a plurality of co-planar sides and a cross-section in the shape of an inverted "T," and by cooling the loop essentially free of restraint on the movement of the sides of the loop so that as the loop cools the sides of the loop will tend to bow concavely relative to the interior of the loop, and the corner angles between contiguous sides of the loop will tend to become more acute, thereby bringing closer together the ends of the loop.

CROSS-REFERENCES TO RELATED APPLICATIONS

This application is a division of application Ser. No. 712,993 filed Mar. 14, 1968, now Pat. 3,481,528 and in part discloses and claims subject matter disclosed and claimed in earlier filed copending applications of the present applicants, F. R. Linda and L. D. Leiter, Ser. No. 565,045, filed July 6, 1966, now matured into Pat. 3,373,-924, issued Mar. 19, 1968 and Ser. No. 521,362, filed Jan. 18, 1966, the latter application having been abandoned.

BACKGROUND OF THE INVENTION

In the marketing and distribution of certain products in containers, it is often desirable for reasons of economy and convenience to package the product in a relatively large container. One example is the packing of fresh milk, which it is more economical to package in half-gallon and gallon containers than in small one quart containers. However, in the case of relatively heavy products such as fresh milk, it is somewhat awkward for the eventual consumer to carry and pour from a large container of the half-gallon or gallon size, especially paperboard containers having smooth surfaces coated with wax or plastic.

SUMMARY OF THE INVENTION

In the present invention there is provided an inexpensive handle device of unique construction to assist in carrying, moving and pouring from paperboard containers, particularly relatively large paperboard containers of the gable top variety in which one end of the gable top serves as a pouring spout. The handle device of this invention is constructed from a single, unfastened or open loop of thermoplastic material, the ends of the loop being designed to be locked securely to each other and to a container by means of the male and female members of a selected closure mechanism. The handle is affixed to a gable top container by inserting the male member of the closure mechanism through a pre-punched hole in the gable ridge of the container and locking together the male and female members to form a closed loop extending through the gable ridge. In its closed loop position, the handle may be pivoted about its point of attachment to the gable ridge so that the handle extends above the gable ridge by a sufficient distance to provide a comfortable hand grip to carry, move or pour from the container. When not in use, the handle may be folded down out of the way by pivoting the handle about its point of attachment to the gable ridge so that the inside of the handle loop passes over that end of the gable top which is opposite to the pouring spout end.

One of the unique features of the handle of this invention is that, in its unfastened condition, the ends of sloping sides bearing elements of the closure mechanism are urged into contact with one another. Because of this unique feature, in those embodiments of the present invention in which the sloping sides respectively terminate in male and female members of the closure mechanism, the male and female elements have a tendency to close together firmly but without locking. This self-closing tendency prevents unwanted interlocking of different handles when large quantities of handles are mixed together, for example, during shipment or during the attachment of handles to containers.

The unique self-closing tendency of the handle of this invention is obtained by constructing the handle in the following manner. A suitable thermoplastic material is molded or formed at an elevated temperature into a unitary open loop having a cross-section in the form of an inverted "T," and a plurality of co-planar sides, for example, five sides. One of the sides serves as a horizontal hand grip, two vertical sides respectively join each end of the horizontal side at first selected corner angles that are substantially right angles, and two sloping sides respectively join the other ends of the vertical sides at second selected corner angles. The unattached ends of the two sloping sides, which also constitute the ends of the open loop, are molded so as to terminate in the elements of a closure mechanism, and these elements are separated from one another while the handle is being molded at an elevated temperature. By making the sloping sides of the loop sufficiently long, and by appropriately choosing the corner angles at which the sloping sides joint the vertical sides, the ends of the sloping sides bearing the closure elements are urged into contact with one another by properly cooling the formed loop of thermoplastic material so that the sides of the loop are caused to bow or warp concavely relative to the interior of the loop, and all of the corner angles between the sides of the loop tend to become more acute. Proper cooling in this instance means cooling the loop essentially free from external restraint, so that as the loop cools, the sides of the loop are free to bow or warp, and the corner angles are free to close in, to bring together in nonlocking contact the closure elements at the ends of the loop.

This unique self-closing tendency of the handle device of the present invention, while in its unfastened state, is further enhanced by shaping the male member of the closure mechanism to resemble a cone with a rounded tip or apex. This shape assures that on cooling of the handle, the resulting urging together of the ends of the sloping sides will cause the male member partially to seat itself within the female member, without locking, despite minor production variations resulting in slight misalignment of the male and female members or slight out-of-plane warpage of the sides.

Those skilled in the art will immediately recognize from the following description and appended drawings that handles embodying the principles of the present invention may be applied with advantage to various types of containers other than gable top containers. However, since it is anticipated that the invention will find most immediate utility in gable top containers, the invention will be described in terms of its application thereto. The description is intended for illustrative purposes only and in no manner to limit the invention.

BRIEF DESCRIPTION OF THE DRAWING

The invention will be fully understood from the following detailed description of illustrative embodiments thereof taken in connection with the appended drawings, in which:

FIG. 5, which is included on the sheet of drawings having FIGS. 8A, 8B, 9A and 9B, is an enlarged view, partially in section, of a preferred closure mechanism for the handle of this invention after it has been attached to the gable ridge of a gable top container;

FIGS. 4A through 4D and 7, is an enlarged side elevation view, partially in section, of a handle with male and female closure elements of the kind shown in FIG. 5, illustrating two kinds of mechanical interlocks for securing the handle of this invention to the gable ridge of a gable top container;

FIG. 7 is an enlarged side elevation view, partially in section, of still another closure mechanism for the handle of this invention, illustrating the handle after it has been secured to the gable ridge of a gable top container;

FIGS. 8A and 8B are enlarged side elevation views, partially in section, of the ends of the handle of this invention, respectively showing an additional closure mechanism before and after the handle has been secured to the gable ridge of a gable top container; and FIGS. 9A and 9B are enlarged side elevation views, partially in section, of a rivet closure mechanism for locking together the ends of the handle of this invention, respectively showing the handle before and after it has been secured to the gable ridge of a gable top container.

DESCRIPTION OF THE PREFERRED EMBODIMENT

Figure 1:
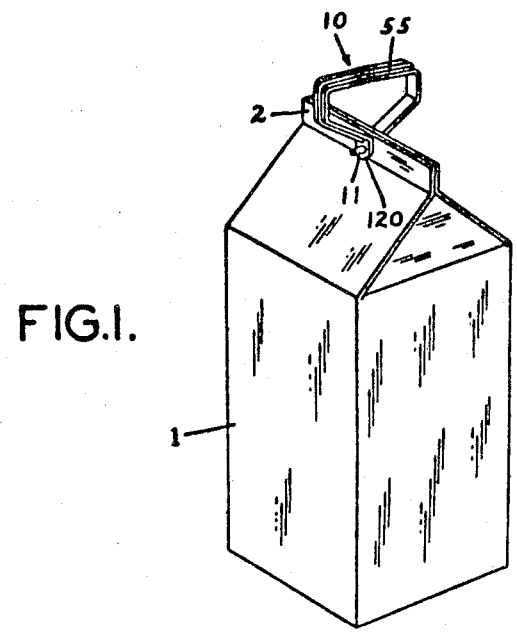
FIG. 1 is a perspective view showing the handle of this invention secured to a gable top container.

Referring now to the drawings, wherein like reference characters designate like elements throughout the several views, there is shown in FIG. 1 a perspective view of the handle device 10 of this invention affixed to a gable top container 1. Gable top container 1, which is of well known construction, customarily terminates at the upper end of its body in a gable top end closure which is surmounted by a longitudinal central rib or gable ridge 2. The handle device 10 of this invention, which has a plurality of coplanar sides, is secured to gable ridge 2 of container 1 by means of a closure mechanism described in detail below. The closure mechanism, which is preferably integral with handle 10, attaches handle 10 to gable ridge 2 by way of a pre-punched hole (not shown) formed at an appropriate point in gable ridge 2, and in its fastened condition, and after attachment to gable ridge 2, handle 10 pivots about this point of attachment. It is to be understood that the pre-punched hole must be located in gable ridge 2 at a point such that the integrity of the container and its pouring spout is not impaired. Also, for convenience in handling the container, the pre-punched hole is located off center so that the handle is closer to the side of the container opposite to the pouring spout. In this manner, it is easier to use the handle to tilt the container for pouring, and to carry two containers back-to-back with one hand. In addition, handle 10 may be folded down out of the way when not in use by pivoting the handle about its point of attachment to the gable ridge so that the inside of the handle passes over that end of the gable ridge which is opposite to the pouring spout.

In its upright position, handle 10 lies in a plane substantially normal to gable ridge 2. It is desirable to make horizontal member 55 of handle 10 sufficiently wide to provide a comfortable grip for a full human hand, and to space horizontal member 55 of handle 10 above gable ridge 2 by a sufficient distance so that the knuckles of a user's hand do not rub the upper edge of gable ridge 2.

Figure 2:
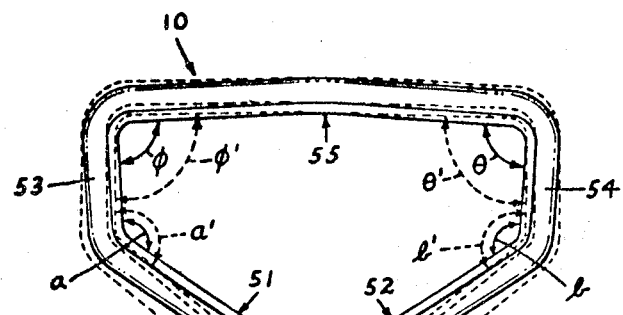
FIG. 2 is a front view illustrating, by way of dashed lines, the handle of this invention as it appears in its open condition at an elevated temperature prior to cooling and illustrating, by way of solid lines, the handle of this invention in its partially closed but unfastened condition after cooling, and its self-closing feature.

A preferred shape for handle 10 may be more readily perceived by reference to FIG. 2, in which it is observed that handle 10 has a five-sided or pentagonal loop shape, in which the five sides of the loop lie in the same plane. A substantially horizontal hand grip side or member 55 is joined at its extremities by two perpendicular sides 53 and 54, perpendicular sides 53 and 54 are respectively joined in turn to two inwardly sloping sides 51 and 52 to complete the loop. It is to be noted at this point that handle 10 is desirably constructed as a unitary loop unfastened at its ends, which is pre-shaped to have the five-sided coplanar structure described herein. The sloping sides 51 and 52 respectively terminate in tab members 110 and 120, each of which is provided with an element of a selected closure mechanism by means of which the loop is converted from its open loop unfastened condition to its closed loop fastened condition, for example, by affixing the handle to the gable ridge of a gable top container.

In a preferred embodiment of the handle of this invention, tabs 110 and 120 are respectively provided with the male and female members of a closure mechanism. One suitable closure mechanism is the snap or interference fit variety shown in FIG. 4A, in which the male member 11 comprises three principal structural elements, a cone-shaped stud 111, a first cylinder shaped extension element 115, and a second cylinder shaped support element 114. The diameter of the circular cross-section of support element 114 and the diameter of the circular base of stud element 111 are approximately equal, and the diameter of the circular cross-section of extension element 115 is smaller than the above diameters of elements 114 and 111. All three elements have a common central axis which is perpendicular to the inner surface of tab 110, and the three elements are positioned upon tab 110 to extend the apex or smaller end of stud 111 toward the complementary female member provided in tab 120 shown in FIGS. 4B and 4C. As shown in FIG. 4D, element 114 supports the handle through the opening in Gable ridge 2, while element 115 extends into the female member in tab 120.

Figure 4B:
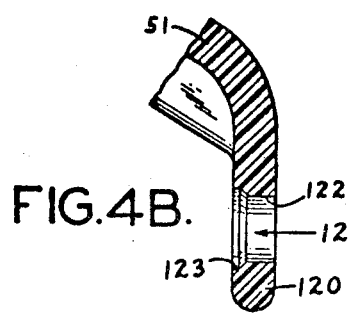
FIGS. 4B and 4C are enlarged side and front elevation views, respectively, of the female member complementary to the male member shown in FIG. 4A.
Figure 4A:
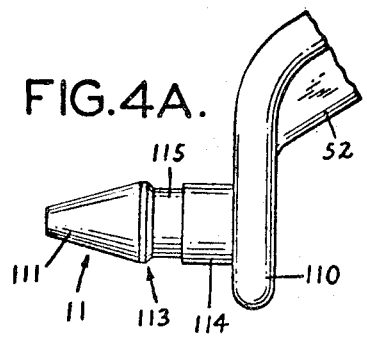
FIG. 4A is an enlarged side elevation view of the shape of the male member of a closure mechanism of the handle of this invention.
Figure 4C:
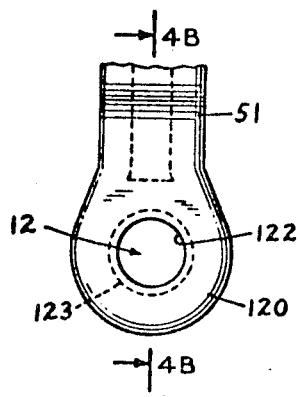
Figure 4D:
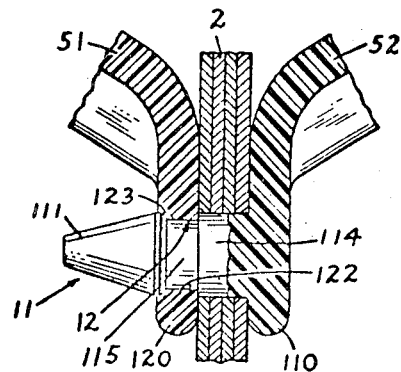
FIG. 4D is an enlarged view, partially in section, of the elements of the closure mechanism of FIGS. 4A, 4B and 4C after the handle of this invention has been secured to the gable ridge of a gable-top container.

The complementary female member 12 for male member 11 is shown in FIGS. 4B and 4C, in which it is observed that opposing tab 120 is provided with a cylindrical opening 122 extending through tab 120 and having its central axis aligned with the central axis of male member 11. Also, cylindrical opening 122 is provided with an annular recess 123 on the opposite side of tab 120, the inner side wall of annular recess 123 being tapered to receive the tapered bottom edge 113 of stud 111 when the male and female members are locked together as shown in FIG. 4D. The diameter of opening 122 is approximately equal to the diameter of extension element 115, while the diameter of recess 123 is approximately equal to the diameter of the base of stud 111.

The manner in which male member 11 and female member 12 are locked together through a gable ridge to fasten handle 10 to a container and thereby form a closed loop handle is illustrated in FIG. 4D. The laminated plies of paperboard or other material forming the gable ridge are denoted by the reference numeral 2, the diameter of the pre-punched hole in the gable ridge being dimensioned to accommodate the cylinder shaped support element 114 of male member 11. In one exemplary procedure for locking togther the male and female members, the male member 11 is first inserted through the pre-punched hole in gable ridge 2, after which the female member 12 is snapped or pressed over stud 111 so that the male member 11 is locked in snap or interference fit relationship with female member 12, the bottom edge 113 of the base of stud 111 being seated within annular recess 123. Because the diameter of the base of stud 111 is larger than the diameter of opening 122, once stud 111 has been forced completely through opening 122, stud 111 tends to remain locked in place with its base resting against annular recess 123.

A preferred shape for the male or stud element is illustrated in FIG. 5, in which stud element 711 is shaped to resemble a cone with a rounded tip or apex rather than a truncated tip. This shape, as described in detail below, enhances the unique self-closing tendency of the handle of this invention. Also, if desired, the bottom edge 712 of stud member 711 may be terminated in a short right cylindrical bottom portion without a tapered edge. Correspondingly, the side wall of annular recess 723 in female member 12 joins opening 122 at right angles in order to receive the right cylindrical bottom portion of stud member 711.

Figure 7:
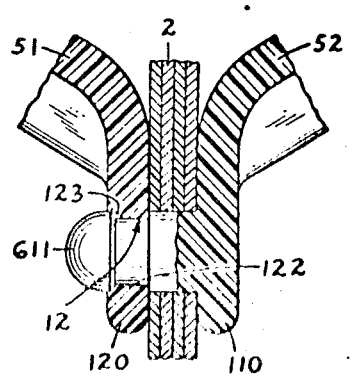

The details of the closure mechanism may be modified in various ways without departing from the spirit and scope of the invention. Thus in FIG. 7 there is shown a hemisphere shaped stud element 611 as an alternative to the truncated cone shaped stud 111 shown in FIG. 4A. An alternative closure mechanism is illustrated in FIGS. 8A and 8B, in which the male member 81 comprises a cone shaped stud element 811 attached to tab 110 by means of a single cylinder shaped support and extension element 82, elements 811 and 82 having a common central axis. The female member in tab 120 comprises a circular opening 83 having a diameter approximately equal to the diameter of the circular cross section of extension element 82. A locking relationship is established between the male and female members by a so-called "heading" technique to form a closed loop handle having the locking structure shown in FIG. 8B. The male member 81 is inserted through a pre-punched hole in gable ridge 2 and into the opening 83 of tab 120 so that the inner surfaces of tabs 110 and 120 are pressed against opposite sides of gable ridge 2 and stud element 811 is extended beyond the outer surface of tab 120. The stud element 811 is then controllably deformed to form a locking cap 84 that abuts the outer surface of tab 120 and thereby locks together the male and female members in a single closed loop handle.

The controlled deformation of stud 811 into locking cap 84 may employ either "cold heading" or "warm heading" techniques. In cold heading, deformation is accomplished by forcing a suitably shaped, unheated die or forming pin against stud 811 so that deformation is accomplished by pressure alone, whereas in warm heading the die or forming pin is preheated to a temperature within the range of about 150° to 200° F. so that deformation is accomplished by a combination of temperature and pressure.

Another closure mechanism is shown in FIGS. 9A and 9B, in which the female member comprises identical cylinder shaped openings 910 and 920 in tabs 110 and 120, with openings 910 and 920 having a common central axis. The male member comprises a separate rivet 9 with a pre-formed hemispherical head 91 and a cylinder shaped support 93 of approximately the same diameter as openings 910 and 920. As illustrated in FIG. 9B, support 93 is inserted through openings 910 and 920, which are positioned in alignment with a pre-punched hole in gable ridge 2, so that the end of support 93 extends beyond tab 110. The thus extended end of support 93 is then controllably deformed to form a locking cap 94 in much the same way as locking cap 84 is formed in the apparatus shown in FIG. 8B.

In the closure mechanisms described above, the male and female elements of the selected closure mechanism are joined together by a single mechanical interlock, either a snap or interference fit interlock or a heading interlock. If desired, however, the handle of this invention may be affixed with greater security to the gable ridge of a container by joining together the male and female elements of a closure mechanism with a double mechanical interlock which combines both the snap fit and the heading arrangements previously described.

Figure 6:
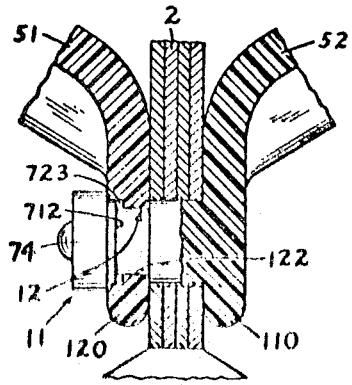
FIG. 6, which is included on the sheet of drawings having

A double mechanical interlock is illustrated in FIG. 6, in which a handle with male and female elements of the type shown in FIG. 5 is shown after it has been affixed to a gable ridge 2; however, it is to be understood that the combined snap fit and heading interlocks may be applied to handles with male and female elements of other configurations. Referring again to FIG. 5, conical stud 711 extending from tab member 110 is inserted through a pre-formed hole in gable ridge 2, and female element 12 integral with tab element 120 is snapped or pressed over stud 711 so that stud 11 is forced through opening 122 to lock in snap fit relationship with female member 12 in the same manner as previously described in connection with the arrangement shown in FIG. 4D. In addition, as shown in FIG. 6, that portion of conical stud 711 which projects through the other side of tab 120 is controllably deformed by either warm or cold heading to form a locking cap 74. Thus, in addition to the interlock formed by seating the cylindrical base element 712 of stud 711 against the bottom of annular receses 723, a second interlock is formed by seating the base of locking cap 74 against the outer surface of tab member 120, thereby to close together the ends of the handle by two sets of mechanical interlocks. It is to be recognized, of course, that the stud element 111 of the embodiment shown in FIG. 4D, may be controllably deformed in a manner similar to that shown in FIG. 6.

Turning back to FIGS. 2 and 3, handle 10 is preferably constructed from a thermoplastic material, such as high density polyethylene, to have the inverted T-shaped cross-section shown in FIG. 3. As shown by the dashed lines in FIG. 2, handle 10 is molded or formed from such a material at an elevated temperature, the dashed lines indicating both the outline of the mold cavity and the shape of the handle before it is removed from the mold. It is noted that the handle is molded in an "open condition," that is, in the "open condition" of handle 10, tab members 110 and 120 are spread apart so that the closure mechanism elements are separated from one another. Also, in the "open condition" of handle 10, the corner angles $\phi'$ and $\theta'$ at which sides 53 and 54 respectively join side 55 are substantially right angles, while the corner angles $a'$ and $b'$ at which sides 53 and 54 respectively join sides 51 and 52 are obtuse angles.

By removing handle 10 from the mold while still quite hot, the sides of handle 10 will tend to bow concavely relative to the interior of the handle and all of the corner angles of the handle 10 will tend to become more acute as the handle cools free from the restraint of the mold, thereby bringing the tab members 110 and 120 closer together and urging the closure elements into partially closed contact with one another. The bowing action is illustrated in FIG. 2 by a comparison between the dashed lines indicating the profile of handle 10 when it is in the mold and still hot, and the solid lines indicating the profile of handle 10 after the handle has cooled outside of the mold. The decrease in all of the corner angles between contiguous sides is illustrated by comparing the four corner angles $\phi'$, $\theta'$, $a'$ and $b'$, before cooling of the handle and while still in the mold, with the corresponding corner angles $\phi$, $\theta$, $a$ and b after the handle has cooled free of restraint. It is observed that corner angles ϕ' and θ' are changed from substantially right angles to angles which are close to but less than right angles, for example, on the order of 86°, and that corner angles a' and b' are made less obtuse.

The desired bowing action and decreasing of corner angles can be accomplished by cooling handle 10 by one of several quenching systems in which the handle is essentially free of restraint. For example, handle 10 may be cooled outside of the mold either in air or in water, water being preferable for quantity production in order to avoid undesired contact with other handles or objects which may impede or distort the bowing action and closing in of corner angles, and to provide better control over temperature during the cooling period. It is to be understood, of course, that other quenching mediums may be employed if desired.

Figure 3:
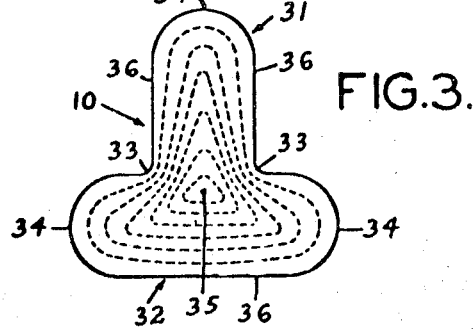
FIG. 3 is an enlarged sectional view illustrating the inverted T-shaped cross-section of the handle of this invention.

The exact thermo-mechanical mechanism that produces bowing of the sides and closing in of the corners of the handle is not completely understood, therefore the following explanation of the bowing phenomenon is to be considered tentative. Referring to FIG. 3, it is believed that the interior line of intersection (shown as a point 35 in FIG. 3) between the vertical portion 31 of the "T" and the horizontal portion 32 of the "T" remains hot longest, because at the inside corners 33 of this intersection, due to a relatively low ratio of the volume of cool mold material to the volume of hot handle material, there is a relatively low heat transfer capacity in the mold at corners 33. In contrast, the extremities 34 of the "T" cool quite readily because of the relatively high ratio of the volume of cool mold material to the volume of hot handle material, which creates a relatively high heat transfer capacity in the mold at these extremities. Falling somewhere between the interior line of intersection 35 and the extremities 34, in terms of cooling rate, are the flanks 36 of the handle.

The dashed lines shown inside handle 10 in FIG. 3 illustrate approximately and solely for explanatory purposes the pattern of isothermal lines that is thought to exist inside a handle of thermoplastic material having the inverted "T"-shaped cross-section shown in FIG. 3. This suggested pattern of isothermal lines indicates that the cooling of the interior of the handle is not uniform, as described above, and this non-uniform cooling is believed to be responsible for the bowing of the sides and the closing in of the corners that occurs when the handle is allowed to cool essentially free of restraints.

The self-closing tendency of the handle of this invention is also a function of the lengths of sloping sides 51 and 52, and the corner angles a and b at which sloping sides 51 and 52 respectively join vertical sides 53 and 54. By appropriate choice of these lengths and corner angles, and by constructing handle 10 of thermoplastic material with a cross-section in the form of an inverted "T" so that the sides of the handle will bow and the corners will close in on cooling, tab members 110 and 120 are urged toward each other. In those embodiments in which tabs 110 and 120 terminate in the male and female members of a closure mechanism, it being preferable that such male and female members be integral with the tabs, the male and female members of an unfastened handle have a tendency to close but not lock together. This self-closing tendency is enhanced in the preferred embodiment described above in which the male member of the closure mechanism has a conical shape with a rounded tip or apex as shown in FIG. 5, so that the tip or apex of the cone is urged to extend within opening 122 of tab 120 as the handle cools, despite production variations such as slight misalignment of the male and female elements or slight out-of-plane warpage of the sides of the handle.

By virtue of this self-closing tendency, handle 10 may be employed with automatic machinery designed to feed and sort parts in large quantities, with relatively small likelihood of interfering with automatic operation which might result from random linking between open handles.

The terms and expressions that have been employed herein are used as terms of description and not of limitation, and there is no intention in the use of such terms and expressions to exclude any equivalents of the features shown and described or portions thereof, but it is recognized that various modifications are possible within the scope of the invention claimed.

What is claimed is:

1. A method for constructing a handle of thermoplastic material to be attached to a gable top container to assist in manipulating said container, which consists of the steps of:

forming said thermoplastic material at a selected elevated temperature into a strip shaped as a unitary five sided open loop in which said strip forming said loop has a cross-section in the shape of an inverted "T" so that upon lowering said elevated temperature of said strip the cooling of the interior of said strip will be non-uniform, said open loop including a first substantially horizontal side adapted to accommodate the human hand, second and third sides each respectively joined at one of their extremities at first selected corner angles that are almost but less than right angles to a corresponding one of the extremities of said first side, and fourth and fifth sides each having the same selected length and respectively joined at one of their extremities at second selected corner angles to the other corresponding extremities of said second and third sides, wherein the other extremities of said fourth and fifth sides terminate in opposing tabs respectively provided with male and female elements of a selected snap fit closure mechanism, and cooling said strip formed into said open loop from said selected elevated temperature while essentially free of restraint on the movement of said sides of said loop so that the non-uniform cooling of the interior of said strip results in said sides of said loop bowing concavely relative to the interior of said loop and said corner angles closing in, wherein said lengths of said fourth and fifth sides and said second corner angles are selected so that in cooperation with said bowing of said sides and said closing in of said corner angles, said male and female elements are urged into partially closed contact with one another.

2. A method for constructing a handle of thermoplastic material, which consists of:

forming said thermoplastic material at a predetermined elevated temperature into a strip shaped as an open loop, in which said strip forming said loop has a plurality of sides in which contiguous sides are joined together at selected corner angles, and a cross section in the shape of an inverted "T" so that upon lowering said elevated temperature of said strip the cooling of the interior of said strip will be non-uniform, and cooling said strip formed into said open loop from said predetermined elevated temperature while essentially free of restraint on the movement of said sides, so that the non-uniform cooling of the interior of said strip results in said sides of said loop tending to bow concavely relative to the interior of said loop, and said corner angles tending to become more acute.

3. A method for constructing a handle of thermoplastic material, which consists of:

forming said thermoplastic material at a predetermined elevated temperature into a strip shaped as an open loop, in which said strip forming said loop has two unattached ends each provided with an element of a selected closure mechanism, five sides in which contiguous sides are joined to one another at selected corner angles, and a cross-section in the form of an inverted "T" so that upon lowering said elevated temperature of said strip the cooling of the interior of said strip will be non-uniform, and cooling said strip formed into said open loop from said predetermined elevated temperature while essentially free of restraint on the movement of said sides of said loop so that the non-uniform cooling of the interior of said strip results in said sides of said loop tending to bow concavely relative to the interior of said loop, said corner angles tending to become more acute, and said elements of said closure mechanism being brought closer together.

References Cited

UNITED STATES PATENTS

| 2,104,673 | 1/1938 | Rieser | 264—237 |
| 3,520,963 | 7/1970 | Allseits et al. | 264—237 |

ROBERT F. WHITE, Primary Examiner

G. AUVILLE, Assistant Examiner

U.S. Cl. X.R.

264—342 R, 348